$\epsilon_{min}$ Feeder     $\epsilon_{max}$ Feeder $t_0$

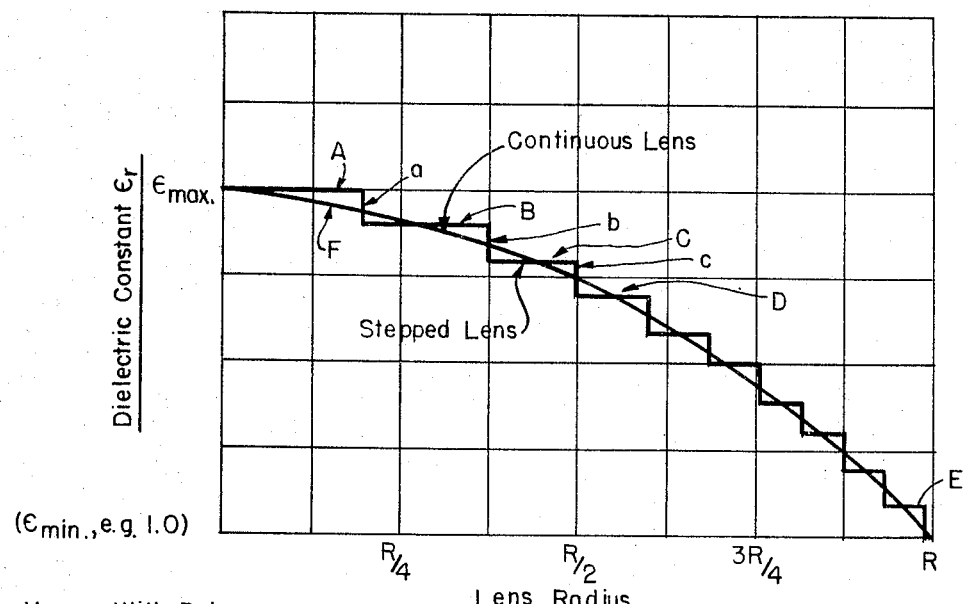
FIG. 1.
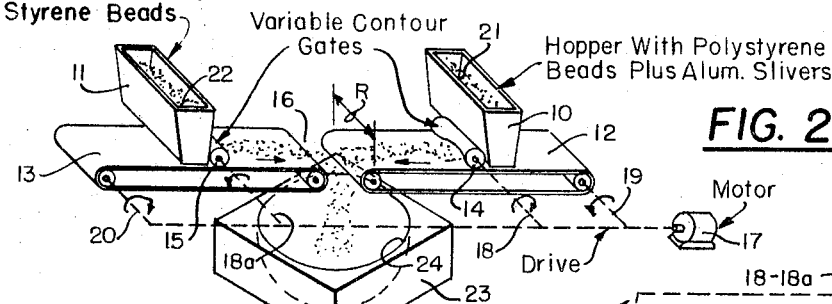
FIG. 2A.
FIG. 2B.
FIG. 2C.
FIG. 3.
INVENTOR.
Robert L. Horst
ATTORNEYS

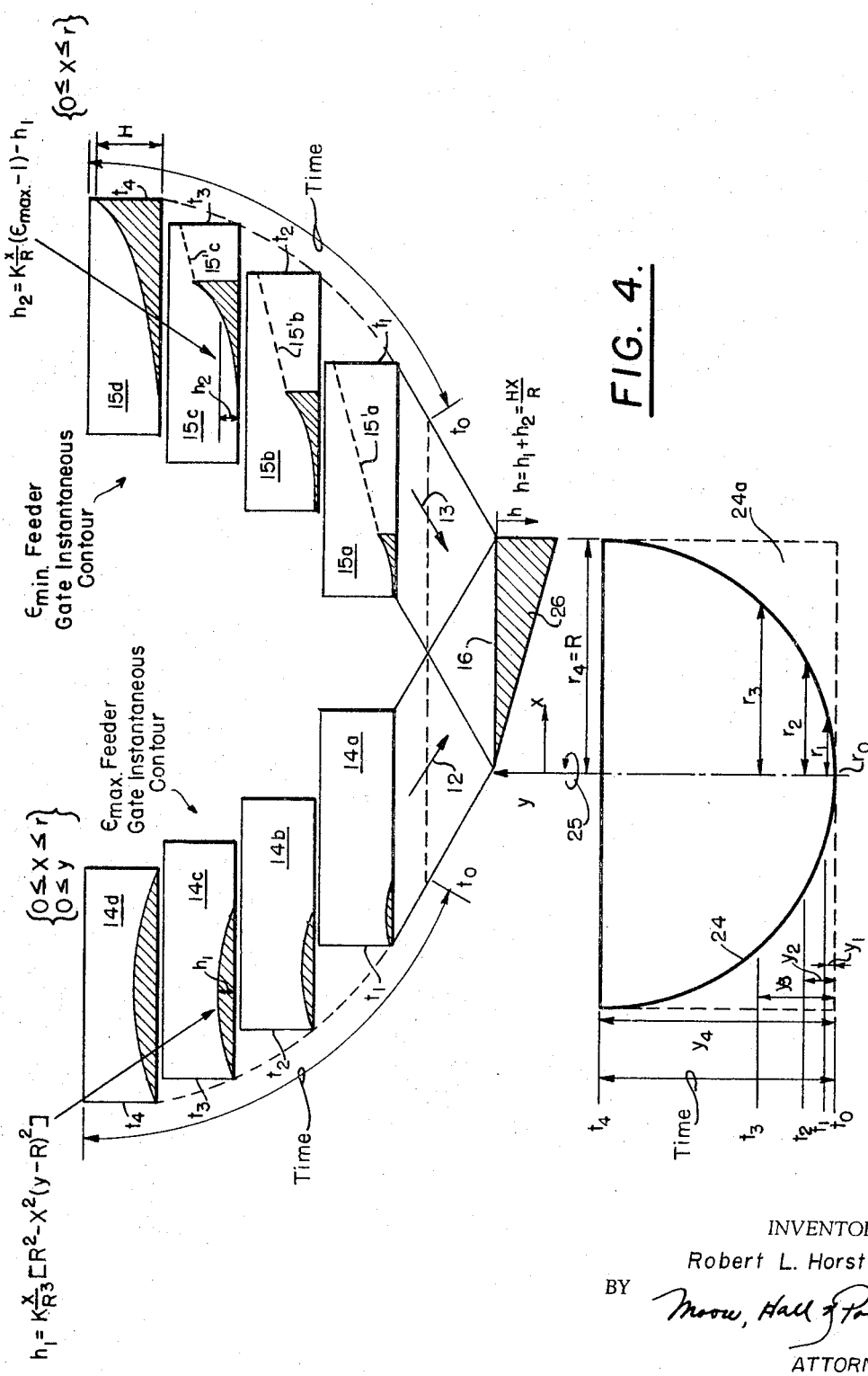

Time ↓

$t_b$

Time ↓

$t_c$

INVENTOR.
Robert L. Horst

INVENTOR.
Robert L. Horst

United States Patent Office 3,321,821
Patented May 30, 1967

3,321,821
THREE-DIMENSIONAL DIELECTRIC LENS AND METHOD AND APPARATUS FOR FORMING THE SAME
Robert L. Horst, Lancaster, Pa., assignor to Armstrong Cork Company, Lancaster, Pa., a corporation of Pennsylvania
Filed Oct. 30, 1962, Ser. No. 234,135
28 Claims. (Cl. 29—155.5)

The present invention relates to the fabrication of a dielectric mass, particularly an improved dielectric lens such as a Luneberg lens, a Maxwell lens, an Eaton lens, or the like, characterized by a dielectric constant and hence a refractive index which varies smoothly and substantially continuously as a function of the lens or mass coordinates. In this respect, the lens of the present invention distinguishes from so-called step-function or stepped-index lenses, which have been produced heretofore, in that, by reason of the novel apparatus and technique to be described, the novel lens of the present invention achieves a substantially continuous gradation of dielectric constant, without significant dielectric discontinuities either at the surface of the lens or in its interior, whereby the novel lens of the present invention is adapted to effect a performance more nearly approaching theoretical performances than has been possible heretofore.

During the last decade, there have been numerous attempts at the fabrication of high quality dielectric lenses for use at high radio frequency, and particularly at frequencies in the microwave portion of the spectrum. One such dielectric lens suggested heretofore is the so-called Luneberg lens, a lens which may be either two-dimensional in form, e.g., substantially cylindrical, or three-dimensional in form, e.g., substantially spherical (or hemispherical, if a reflecting plane is used), depending on the focus desired and the configuration of the feed antenna (horn, dipole, etc.). In the case of three-dimensional dielectric lenses, Luneberg has shown that, in theory, if electromagnetic energy in the form of a plane wave impinges upon such a lens, said electromagnetic energy will be refracted and concentrated at substantially a point focus positoned at the surface of the lens. Luneberg has further shown, since reciprocity applies, that energy injected into the device at the point focus mentioned will similarly be refracted and transmitted as a plane wave.

In order for the lens to operate in the manner described, Luneberg has taught that the refractive index ($n$) of a three-dimensional lens should vary as a function of the radial coordinates ($r$) of the lens according to an equation which reduces to:

$$n = \sqrt{2 - \left(\frac{r}{R}\right)^2} \qquad (1)$$

where R is the lens radius. Based upon the results of Luneberg's work, subsequent workers in the field have shown that, by appropriate modification of the dielectric gradation, the actual position of the focus at the lens (Luneberg has shown that a second focus would also exist, in theory, at infinity) may be shifted to other positions either interior of the lens or spaced externally of the lens surface.

As will be appreciated from the formula given above, the dielectric constant or refractive index of the lens should vary smoothly and continuously as a function of the lens radial coordinates if operation according to the theoretical is to be achieved. To the present time, however, no practical techniques have been suggested for fabricating a dielectric lens having such a continuously varying dielectric constant. Accordingly, it is the practice at the present time to fabricate such lenses by assembling various lens subcomponents (e.g., blocks of material, concentric cylinders or shells, etc.) to effect a step-wise approximation of the theoretical refractive index gradation.

These step construction techniques, prevalent at the present time, are accompanied by a number of distinct disadvantages. It has been found, for example, that the subcomponents employed, e.g., blocks, shells, etc., in a stepped-index lens necessarily have different dielectric constants; and when the various subcomponents are assembled, dielectric discontinuities result at the abutting junctions of the subcomponents with attendant reflections and dispersive losses at those junctions. Refinement of such a lens necessitates reduction of the dielectric step size, thereby requiring constructional modules of smaller dimensions. The consequent increase in the number of modules employed obviously serves to further complicate the interface problem, in that a multiplicity of junctions exists, each of which represents a dielectric discontinuity and as such is a reflecting plane. The fractional reflected power for wave (normal) incidence at such a dielectric interface is described by the well-known relationship $$R^2 = \frac{(n_1 - n_2)^2}{(n_1 + n_2)^2}$$

where R is the reflection coefficient and $n_1$, $n_2$ are the refractive indices of the two mediums. Similar expressions describe reflection for arbitrary angles of incidence and are presented in many texts on electromagnetic field theory, e.g., "Electromagnetic Fields and Waves"—R. V. Langmuir. The undesired reflections always accompany the desired wave refraction and are by no means insignificant as can be seen by evaluation of the equations noted.

In an effort to avoid these dispersive losses, various alternative techniques have been suggested for assembling three-dimensional lenses wherein the various subcomponents employed exhibit a dielectric gradation of sorts within each such subcomponent. One such suggestion made heretofore involves the assembly of small angle lunar wedge segments (e.g., something in the order of 180 such wedges, each subtending substantially a 2° angle) into a substantially spherical structure. In such cases, while in theory dielectric discontinuities do not exist, the multiplicity of interfaces affords opportunity for wave scatter as a result of imperfections (dielectric error, air gaps, cement joints, etc.) produced during the lens assembly.

Moreover, there has been an even more serious problem in this prior suggestion for fabricating a three-dimensional lens from such lunar segments, in that the dielectric gradation achieved within each such wedge has been accomplished by a compression technique operative to produce the dielectric gradation by a density gradation within the wedge. In particular, this prior technique has contemplated initial fabrication of a dielectric mass having substantially constant density, with that mass then being variably compressed into a lunar wedge so as to effect a desired dielectric gradation within the wedge (since the dielectric constant is varied by variations in density). While a desired dielectric gradation has thus been achieved, the resulting varying density wedge, and thereby the resulting three-dimensional lens, has been found to be anisotropic, i.e., the actual variation in dielectric constant has been found to be a function of aspect whereby a given incremental unit of the lens exhibits different dielectric constants in different directions. Such anisotropic lenses produced by varying density subcomponents thus produce rotation of the field vectors during propagation of energy through the lens medium, whereby the polarization and velocity of a transmitted or received wave is altered in the lens. This phenomenon, commonly termed "birefringence," of itself has caused the resulting lens to depart in operation from that taught by Luneberg, since one theoretical advantage of a Luneberg lens is that the polarization of a propagated wave is not affected.

An additional consideration in the construction and application of any lens is its ultimate weight. A lens constructed by the above compression technique will of necessity be a "heavy" lens, as compared to one fabricated of light-weight foam base material not appreciably altered in density. It may be shown by manipulation of the empirical equation describing the refractive index ($n$) as a function of (polystyrene) density ($d$) in lbs./cu. ft.:

$$n = \sqrt{1 + 0.02d}$$

and Equation 1, supra, that the weight ($w$) in lbs. of such lens will be $$w = \frac{4\pi}{0.15} R^3$$

where R is the lens radius in feet. The average density regardless of sphere size is approximately 20 lbs./cu. ft.

A further disadvantage of step constructed lenses suggested heretofore is that such lenses must be "assembled"; and such assembly steps are extremely time-consuming and costly procedures if extraneous physical discontinuities are to be minimized. Moreover, the assembly techniques employed heretofore necessarily require that lens testing procedures be deferred until after the lens has been completely assembled; and there is no way to evaluate the final lens structure, as a lens, without first expending time and money in assembly.

Finally, notwithstanding all of these difficulties, the resulting step-function lens, even if carefully made, necessarily does not conform to theoretical operation since, by the very nature of the lens, it comprises a stepped dielectric gradation rather than a smooth and continuously varying gradation.

The present invention obviates the various problems mentioned, and produces a novel lens structure wherein the lens dielectric constant varies smoothly and continuously as a function of the lens radial coordinates in accordance with any particular formula which may be selected for any particular lens. Of equal importance, the novel lens of the present invention effects this continuous dielectric constant gradation in a substantially constant, and if desired, low density medium, whereby the lens of the present invention is isotropic, thereby distinguishing from variable density lens which are necessarily anisotropic, as well as from stepped-function lens with their resulting dielectric discontinuities and reflections. In short, the present invention achieves a novel three-dimensional lens which is adapted to receive and transmit incident radiation in a fashion more closely approximating the theoretical than has been possible heretofore. Moreover, the present invention achieves this result by a novel fabrication technique which directly produces a lens having the desired continuous variation without requiring assembly steps. The lens of the present invention may therefore be evaluated as a lens immediately upon completion of its fabrication, without the necessity of expending the considerable time and costs attendant lens assembly procedures normally employed and required heretofore.

It is accordingly an object of the present invention to provide an improved three-dimensional dielectric lens, of substantially spherical or other appropriate configuration, having a dielectric constant which exhibits a uniformly varying gradation in a substantially constant density medium. In the specific example to be described hereinafter, the fabrication of a Luneberg lens will be described; but as will be apparent, the technique here involved may be utilized in the fabrication of dielectric masses having quasi-optical configurations other than those specifically contemplated by Luneberg.

Another object of the present invention resides in the provision of an improved three-dimensional dielectric lens which eliminates dielectric discontinuities, wave reflections, and energy losses which have characterized step-function dielectric lenses fabricated heretofore.

Still another object of the present invention resides in the provision of an improved dielectric lens which exhibits a substantially smooth and continuous variation of refractive index in a variably loaded substantially constant density true or artificial dielectric medium, whereby said lens eliminates the problems of anisotropy which have characterized varying density three-dimensional lens suggested heretofore, and whereby said lens further achieves radiation patterns and wave refractions more nearly approximating theoretical performance than has been possible in the past.

Still another object of the present invention resides in the provision of a novel dielectric lens which may be more readily fabricated, and at less cost, and which may be more readily tested and evaluated as a lens than has been possible heretofore.

A further object of the present invention resides in the provision of a novel fabrication technique, as well as in the provision of novel arrangements for feeding and gating dielectric materials, adapted to produce a continuously varying dielectric constant (hence a continuously varying refractive index) across a body of dielectric material.

A still further object of the present invention resides in the provision of novel fabrication apparatuses and techniques for fabricating three-dimensional dielectric lenses exhibiting the various features and advantages described.

In achieving the various objects and advantages described above, the present invention contemplates the fabrication of a mass of dielectric or artificial dielectric material having a substantially continuous variation of dielectric constant and refractive index in three dimensions, effected by means of a variable loaded dielectric medium wherein the loading concentration is smoothly and continuously varied as a function of the dimensional coordinates of said mass. When an artificial dielectric is employed, it preferably consists of an array of randomly oriented metallic particles supported by a low density dielectric material. The metallic particles may, for example, comprise insulated aluminum slivers preferably of substantially needle shape, and preferably having a length less than $\frac{1}{8}$ wavelength. The supporting matrix in turn may take the form of a low loss plastic material, e.g., low density polystyrene beads or spheroids also preferably less than $\frac{1}{8}$ wavelength in size, with a typical such material comprising, for example, commercially available "Armalite," a trademark of the Armstrong Cork Company, Lancaster, Pa. Composite loaded materials of this type simulate an actual dielectric when immersed in an electromagnetic field. In particular, the impressed field operates in a conventional dielectric medium to set up submicroscopic dipoles which serve to alter the velocity of propagation of waves therein; and in an artificial dielectric material of the type described, this principal effect is achieved microscopically by the aforementioned conductive particles or slivers, with the randomly oriented metallic slivers operating to delay waves in the medium.

In fabricating a lens of the type contemplated by the present invention, with metallic-obstacle dielectric materials of the type described, or with other appropriate dielectric materials, a cross-feeding system or technique is preferably employed. Thus, where an artificial dielectric material is to be utilized, a mass of dielectric beads, particles or granules interspersed with flakes or slivers of metal, e.g. aluminum (whereby the composite mass exhibits a dielectric constant greater than unity), can be cross-fed with a lower index dielectric material comprising, for example, plain polystyrene beads identical to those which serve as the vehicle for the metallic slivers. A similar cross-feeding technique may be employed with conventional dielectric materials, e.g., a particulate high dielectric constant material may be cross-fed with a particulate substantially unity dielectric constant material; and in either case, i.e., using either conventional or artificial dielectric materials, a refractive index variation may ultimately be achieved through such cross-feeding, by controlling and varying the loading concentration of the cross-fed materials.

In particular, the two flowing streams of dielectric material, respectively having dielectric constants greater than and substantially equal to unity, may be fed into a mold or charge box of appropriate geometry, e.g., a substantially hemispheroidal cavity (or, in accordance with a variant of the invention, into a cylindrical cavity) through specially contoured gates associated respectively with the flowing streams. In accordance with the preferred technique of the present invention, the gate contours employed are three-dimensional in character, comprising either a plurality of differently contoured substantially planar plates which are successively placed into operation adjacent the flowing streams, or in the alternative comprising substantially solid three-dimensionally contoured gating surfaces, different cross-sections of which are rendered successively operative to control the flow of material. The said three-dimensionally contoured gates (a term which will be used hereinafter to describe either solid or plural plate gates) are moved, caused to move, or altered in position at appropriate times, e.g., at a rate related to the rate of movement of the aforementioned flowing streams or at a rate related to the linear rate of conveyor belts associated with said flowing streams; and the aforementioned charge box, mold, or collection cavity is rotated as the cross-fed variably gated material is fed therein. The gating contours, which will be described more fully hereinafter, in cooperation with the rotating charge box and flowing materials, thus coact to achieve an appropriate variation in material loading concentration, and simultaneously achieve a proper layering of the cross-fed material in the charge box, whereby the desired smoothly and continuously varying index and layering of material is automatically effected.

The substantially smooth lay-up of true or artificial dielectric material thus effected in the aforementioned charge box, having a desired continuous, smooth dielectric gradation in three dimensions, may thereafter be fused, e.g., by a steam molding step, into a monolithic substantially hemispheroidal mass, or into a substantially cylindrical mass having a hemispheroidal dielectric gradation therein. The mass thus produced may then be unmolded and heat-treated for an appropriate extended period of time to effect the removal of all moisture therefrom, and also to insure dimensional stability in the final lens. Moreover, the mass thus produced can be immediately tested as a lens without the need of the costly and time-consuming assembly steps which have characterized lens fabrication techniques suggested heretofore; and if the lens characteristics are, in such a test, found to depart from those desired, the dielectric media, and/or the loading concentration therein, can be appropriately changed before continuing with the fabrication of further lens units.

The overall technique thus produces directly a monolithic mass having a desired three dimensional variation in dielectric constant; and moreover effects such a lens structure by a technique which permits the final lens to be immediately evaluated, which achieves far greater accuracy in lens optics than has been possible heretofore, and which assures that this accuracy can be caused to persist as multiple such lenses are fabricated in mass production, a result impossible heretofore.

The foregoing objects, advantages, construction and operation of the present invention will become more readily apparent from the following description and accompanying drawings, in which:

FIGURE 1 is a graph illustrating the dielectric characteristics of lenses achieved by the present invention, as compared with step-function lenses of the type suggested heretofore;

FIGURES 2A, 2B and 2C illustrate an apparatus which may be employed in fabricating an improved lens of the type contemplated by the present invention, as well as successive steps in the method of lens formation which characterize a preferred embodiment of the present invention;

FIGURE 3 is a top view of the apparatus shown in FIGURE 2A;

FIGURE 4 is an illustrative diagram showing typical gating contours, and certain timing considerations associated therewith, employed in the fabrication of an improved lens constructed in accordance with the present invention;

Figure 5A:
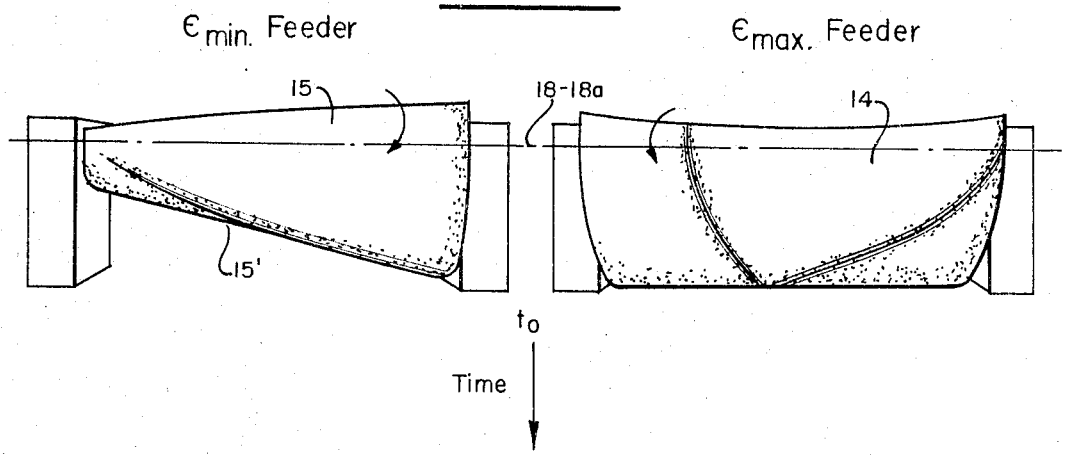
Figure 5B:
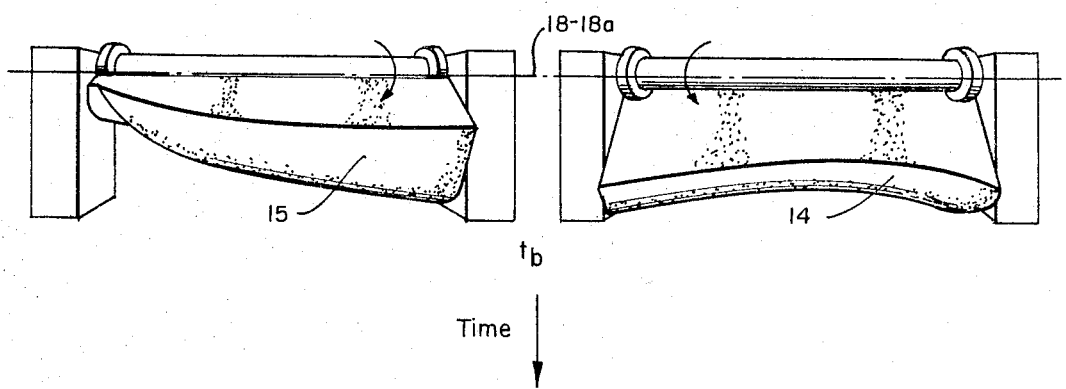
Figure 5C:
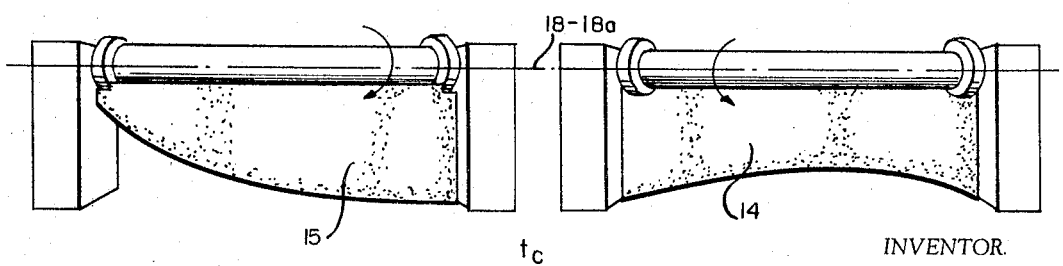
Figure 6A:
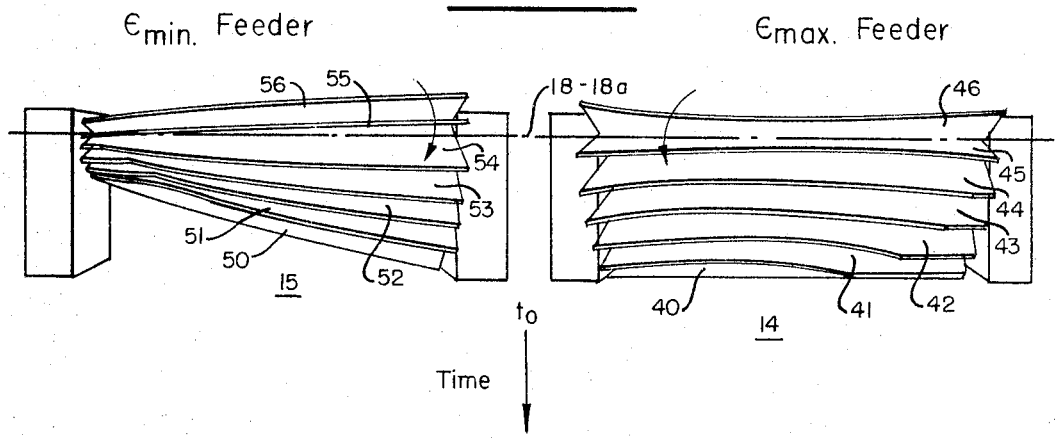
Figure 6B:
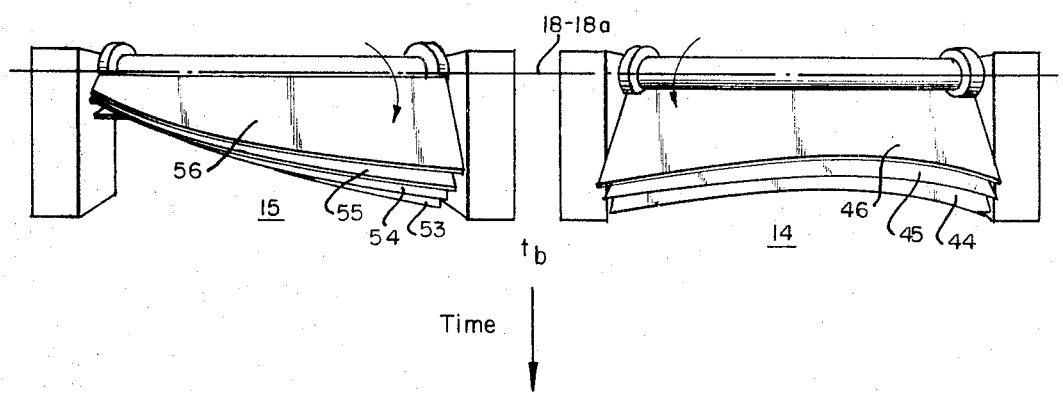
Figure 6C:
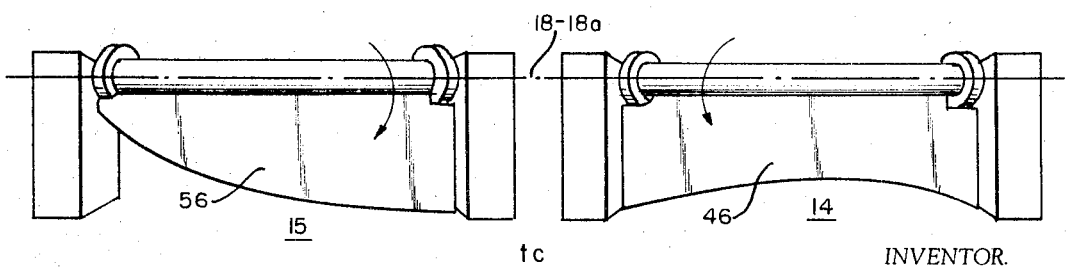

FIGURES 5A, 5B, and 5C comprise sets of perspective views showing three-dimensional solid gates constructed and synchronously moved in accordance with the present invention; and further show gates of the type which would be employed in the fabrication of a modified lens constructed in accordance with the present invention; and FIGURES 6A, 6B, and 6C are views similar to those of FIGURE 5, showing plural-plate gates of the types which may be employed in the present invention.

Referring initially to FIGURE 1, it will be seen that the continuous lens of the present invention exhibits a dielectric gradation which is characteristically different from the gradations exhibited by stepped-index lenses suggested heretofore. A comparison of these two general types of lenses has been shown graphically in FIGURE 1. The stepped lens is normally produced by assembling a plurality of modular units having discretely different dielectric constants. Thus, a first unit exhibiting a dielectric constant A (equal for example to $\epsilon_{max.}$, the maximum dielectric constant desired in the lens) may be provided in the form of a core or the like disposed adjacent the center of the lens. Proceeding outwardly from the core, having dielectric constant A, further modules having successively lesser dielectric constants B, C, D, etc., may be provided in the form of concentric shells or the like surrounding the aforementioned core; and the outermost surface of the lens would normally be formed by a final shell having a dielectric constant E somewhat greater than $\epsilon_{min.}$, the lowest dielectric constant to be exhibited by a lens portion.

The graphical representation on the stepped-index lens shown in FIGURE 1 is characterized by vertical lines $a$, $b$, $c$, etc., forming junctions between the successive modular units or subcomponents of the lens; and, as will be immediately appreciated by examination of FIGURE 1, each such vertical line represents a dielectric discontinuity produced at a modular interface and operative to produce the losses and other disadvantages previously discussed. In marked distinction to this known characteristic of stepped lenses, the continuous lens of the present invention exhibits a smooth and substantially continuous variation in dielectric constant represented by curve F; with this continuous and smooth variation in dielectric constant varying as a function of the lens radius between dielectric constant of values $\epsilon_{max.}$ (at the center of the lens) and $\epsilon_{min.}$ (at the outermost surface of the lens). By reason of the smooth variation thus achieved, the various discontinuities $a$, $b$, $c$, etc., are avoided.

Curve F shown in FIGURE 1 can take various shapes depending upon the particular lens which is to be fabricated; and the actual shape of curve F can be controlled in accordance with the present invention by appropriate control of the dielectric media employed as well as by control of the gating configurations selected. In the case of a Luneberg lens, curve F should have the equation $$\epsilon_r = 2 - \left(\frac{r}{R}\right)^2 \quad (2)$$

where $r$ is the radial coordinate of the lens. In theory, as will be seen by comparison of Equations 1 and 2, supra, it will be noted that, when lossless dielectric materials are employed, the relative dielectric constant ($\epsilon_r$) thus equals the square of the index of refraction $n$. By appropriate variation of the dielectric gradient, modified Luneberg lenses may be constructed having either one focal point external to the lens and the other internal, or both points located externally; and still other types of lens can be constructed having foci and disposition thereof corresponding to those contemplated in theory by workers in the field other than Luneberg.

The present invention, and the apparatus and techniques to be described hereinafter, are particularly useful in the formation of lenses, having a desired smooth and substantially continuous variation in dielectric constant, and taking the form of a sphere or a spherical segment. As is well understood, a spherical segment comprises a solid bounded by a sphere and two parallel planes intersecting, or tangent to the sphere. If one plane is tangent to the sphere, the segment is sometimes termed a spherical segment of one base; and a particular case of such construction comprises a hemisphere wherein said one base is located in a plane passing through the axial center of the sphere. When the spherical segment is formed by two planes intersecting a sphere, the structure is sometimes termed a spherical segment of two bases, and such construction can also be fabricated by the present invention. In addition, as will become apparent from the subsequent description, the present invention is adapted to fabricate a truly spherical monolithic lens by appropriate attention to the gate programs employed.

In order to produce a lens having a desired smooth and substantially continuous variation in dielectric constant, in three dimensions, in a substantially constant density medium, a technique and apparatus generally of the type shown in FIGURES 2A, 2B and 2C, and in FIGURE 3, may be employed. The particular apparatus and technique here illustrated employs a dilution technique involving the cross-feeding and blending of two particulate dielectric materials respectively having different dielectric constants, and said cross-feeding and blending is programmed with time to achieve appropriately different dilutions of said two materials at different points in the mixed materials with elapse of time.

Thus, referring first to FIGURES 2A and 3, a pair of hoppers 10 and 11 may be provided adjacent to and in association with a pair of aligned conveyors 12 and 13; and in further association with a pair of appropriate three-dimensionally contoured gates 14 and 15. Gates 14 and 15 will be described more fully hereinafter in reference to FIGURES 4 through 6 inclusive; and as will there appear, said gates preferably exhibit three-dimensionally contoured surfaces produced by either smooth substantially continuous three-dimensionally warped gating members, or by a plurality of differently contoured gating plates which are rendered successively operative to control the flow of materials from hoppers 10 and 11 toward a central discharge point or line 16. In either case, the actual gating function accomplished by gates 14 and 15 varies with time, thereby to produce a desired program in the cross-fed materials being built up.

The aforementioned flow programming can be achieved by mounting the three-dimensionally contoured gates 14 and 15 for rotation adjacent to and above conveyors 12 and 13, at locations upstream of discharge point 16. In order to assure accuracy in the desired program, the gates 14 and 15 are preferably driven synchronously under the control of a common drive source, e.g., motor 17, through the agency of appropriate drive means 18 and 18a connected to one another and to said motor 17. The conveyors 12 and 13 are also driven by appropriate drive means 19 and 20, either by motor 17 or by some other driving source operative at a drive rate appropriately related to that of motor 17. The gate and conveyor drives may take any appropriate form, e.g., chain belt drives, gear drives, etc.; but care should be taken to assure that gates 14 and 15 move synchronously with one another and in properly timed relation to the movement of conveyor belts 12 and 13, whereby the changes in gate openings (and the resulting programming of the material dilutions accomplished) is properly related to the layering of material into a charge box disposed below discharge point or line 16.

Hopper 10 contains a pre-mixed blend 21 of polystyrene beads and aluminum slivers having a dielectric constant greater than 1; and in particular, having a dielectric constance of $\epsilon_{max.}$, the maximum dielectric constant required by the final lens. In a typical case, this high index blend may have a dielectric constant of 1.92. The hopper 11 in turn contains a diluent 22 having a relatively low index dielectric material therein comprising, for example, plain polystyrene beads identical to those which serve as the vehicle for the metallic slivers in blend 21; and in a typical case, the dielectric constant $\epsilon_{min.}$ of the plain polystyrene beads in hopper 11 may be 1.03.

While it has been indicated that the mixed blend 21 is contained in a hopper 10 as a pre-mixed batch of material, even more accuracy in the final product can be achieved by replacing hopper 10 with a preliminary pair of conveyors and hoppers adapted, by a dilution technique similar to that shown in FIGURE 2A, to effect a highly accurate and controlled starting blend having the desired dielectric constant, e.g., 1.92. To this effect, the hopper 10 may be replaced by a further pair of auxiliary conveyors associated in turn with a further pair of auxiliary hoppers. One of these further or auxiliary hoppers may contain a batch of blended polystyrene particles and aluminum slivers having a dielectric constant higher than that desired of the material on conveyor 12; and the second of these auxiliary hoppers may contain plain polystyrene beads. The material in these two auxiliary hoppers may be fed along said two auxiliary conveyors through automatically controlled gates, the vertical positions of which may be variably changed with changes in the actual dielectric constant of the material passing along at least one of said conveyors. The gate control can be achieved by an appropriate sensing circuit, all as shown, for example, in my prior copending application Ser. No. 52,932 filed Aug. 30, 1960, for "Admittance Meter and Dielectric Control System," now U.S. Patent No. 3,149,-650, issued Sept. 22, 1964.

With this further refinement an initially mixed blend would be discharged from the aforementioned auxiliary conveyors onto conveyor 12 at a position equivalent to the discharge end of hopper 10; and by the arrangement described, an extremely accurate control of the dielectric constant of the mixed blend passing along conveyor 12 would thus be achieved. This, however, represents a refinement which is not essential to the present invention; and the actual arrangement shown in FIGURE 2A, utilizating a pre-mixed blend in hopper 10, gives entirely adequate results.

The material from hoppers 10 and 11 passes, as described previously, along conveyors 12 and 13 through openings instantaneously provided by the three-dimensionally contoured gates 14 and 15 to the aforementioned discharge point 16, whereupon the resultant mixed blend of relatively high index and relatively low (or near-unity) index dielectric material is dumped into and collected in a charge box (or mold) 23. As will appear hereinafter, said charge box or mold 23 may have a substantially cylindrical recess; and the gates 14 and 15 may be so contoured that a substantially cylindrical mass of material is produced therein taking the form of substantially constant index material having a spherical segmental portion embedded therein and exhibiting a desired three-dimensional variation in dielectric constant. In that particular embodiment of the invention, the monolithic lens once formed may have the substantially constant index material removed therefrom by an appropriate turning operation so as to leave only the desired spherical segment (sphere, hemisphere, or lesser or greater segment). In the particular embodiment actually shown in FIGURE 2A, a substantially hemispherical lens is directly formed; and to this effect, the charge box 23 preferably defines an internal substantially hemispherical cavity 24 formed, for example, by means of a light gauge aluminum shell of hemispherical configuration supported within said charge box 23.

The width of each of conveyors 12 and 13, and the maximum length of the three-dimensionally contoured gates 14 and 15, is chosen to equal either the radius or the diameter of the finally planned lens; and is similarly chosen to equal a radius or diameter of the hemispherical recess 24 in charge box 23. Radial length gates and conveyors have been shown in the drawings; but each radial length gate may be expanded to diameter length by adding, to each such gate, a further gate section contoured as the mirror image of the gate actually shown and to be described. Moreover, as will appear hereinafter, the three-dimensionally contoured gates 14 and 15 actually shown in the drawings have their gating surfaces so contoured that a substantially hemispherical lay-up is achieved during any particular gate program. However, by appropriate circumferential extensions or modifications of the gating surfaces, the program may be caused to achieve a truly spherical lens rather than a hemispherical lens, or can be caused to achieve any other desired spherical segment; and this latter operation is particularly feasible in that embodiment of the invention (to be described hereinafter) wherein the three-dimensionally varying portion of the lay-up is embedded within a further supporting mass of dielectric material having, for example, substantially constant index.

In the case of radial width conveyors and gates, and as best shown in FIGURE 3, the aligned conveyors 12 and 13 are so positioned with respect to the cavity or recess 24 in charge box 23 that their respective edges lie between the axial center and outer periphery of said recess 24. The blended material discharged at 16 into recess 24 is therefore laid up in said recess along a radius of the recess. The gates 14 and 15 are, moreover, so contoured and programmed that, as the lay-up of material in recess 24 commences, the flowing material is initially confined to a point directly under the axial center of the lens (the innermost edges of conveyors 12 and 13) and comprises, at this initial time, substantially $\epsilon_{min.}$ material only. The gate programming further operates to successively increase the instantaneous charge radius along which said cross-feeding of materials occurs, in directions outwardly of the axial center of recess 24, as time proceeds. Moreover, during the material lay-up, with the successively increasing charge radius achieved by the gate programs, charge box 23 is rotated as at 25 so that the blended material is distributed evenly and with circular symmetry along the complete successively increasing circular cross-sections of hemispherical recess 24; and in practice, the rate of rotation 25 of charge box 23 is chosen merely to be sufficiently fast to assure a smooth and symmetrical lay-up of dielectric material in recess 24.

The desired three-dimensional variation in dielectric constant of the granular or particulate material deposited in recess 24 is thus achieved by rotation of charge box 23, in cooperation with the movement of contoured gates 14 and 15. The actual contour of these gates is, as mentioned, selected in accordance with the particular type of lens which is desired to finally produce; and in the case of a Luneberg lens, the contours of said gates 14 and 15 may be similar to those illustrated in FIGURES 4 through 6, to be described hereinafter. In such a Luneberg lens, the refractive index ($n$) should vary in accordance with Equation 1 given previously; and this may, as previously mentioned, also be expressed as a variation in relative dielectric constant ($\epsilon_r$) as given in Equation 2, supra. To achieve such a relationship, the contour of gate 14, associated with the relatively high index blend 21 in hopper 10 can be expressed by the equation $$h_1 = \frac{Kx}{R^3}[R^2 - x^2 - (y-R)^2] \begin{Bmatrix} o \leq x \leq r \\ o \leq y \end{Bmatrix} \quad (3)$$

where $h_1$ = the height, at any particular point, of the aperture in gate 14,
$R$ = the final lens radius,
$r$ = the instantaneous charge radius,
$\epsilon_{max.}$ = the maximum dielectric constant required in the lens,
$x$ and $y$ = lens dimensional variables, and
$K$ = a feeder constant equal to:

$$\frac{H}{(\epsilon_{max.} - 1)}$$

where $H$ = the maximum gate opening achievable.

In addition, the contour of gate 15, associated with the hopper 11 containing near-unity index plain polystyrene beads, can be expressed by the equation:

$$h_2 = \frac{Kx}{R}(\epsilon_{max.} - 1) - h_1 \{o \leq x \leq r\} \quad (4)$$

where $h_2$ = the height at any particular point of the aperture in gate 15.

Each of the other variables in Equation 4 has been discussed previously in connection with Equation 3.

The two gates 14 and 15 have their contours so selected that a desired gradation in dielectric constant is achieved across successively increasing instantaneous radii of successive circular planes in recess 24. In effect, gates 14 and 15 achieve this desired gradation in dielectric constant, and the desired programming of lens gradient, by effecting an appropriate variation in the loading of the blend across successive instantaneous radii of recess 24 at successive positions below discharge line 16 and increasingly above the lowermost point in recess 24. The said gates 14 and 15, moreover, cooperate with one another to achieve a combined flow having a smoothly varying rate at different points along said successive instantaneous radii of charge box 24, with the actual deposition of material following a substantially triangular distribution pattern (shown at 26 in FIGURES 3 and 4) comprising substantially zero flow adjacent the axial center of recess 24, and maximum flow at the successive different circumferences corresponding to successive different instantaneous charge radii of recess 24.

This triangular dumping or distribution of materials can be best appreciated by consideration of Equation 4, supra; and in particular, by transposition, it will be seen that:

$$h_1 + h_2 = K\frac{x}{R}(\epsilon_{max.} - 1) \quad (5)$$

Since $$K = \frac{H}{\epsilon_{max.} - 1}$$

one finds by substitution in Equation 5 that:

$$h = h_1 + h_2 = \frac{Hx}{R(\epsilon_{max.} - 1)}(\epsilon_{max.} - 1) = \frac{Hx}{R} \quad (6)$$

Equation 6, which represents the resulting composite opening of the two gates 14 and 15 at any particular time is, of course, the equation of a straight line, and the area between this line and the abscissa over the region of interest on an "$xh$" plot is a triangle. The triangular dumping or deposit of the dielectric material thus achieved by this relationship between gates 14 and 15 assures that a substantially smooth lay-up of material is achieved in the successive instantaneous charge planes of hemispherical recess 24 as charge box 23 is rotated.

It will be appreciated, of course, that arrangements alternative to those shown in FIGURES 2A and 3 are available to achieve substantially similar final results. By way of example, the conveyor belts 12 and 13, rather than having a width substantially equal to the central radius of recess 24, and rather than being associated with contoured gates such as 14 and 15, can be replaced by small capacity feeders having a width much less than the radius of the charge box. With this alternative arrangement, the actual dielectric constant of the material flowing along the small capacity feeders can be appropriately programmed as required for a given lens configuration, e.g., in accordance with Equations 3 and 4 for a Luneburg lens; and the charge box can also be position-programmed, i.e., rotated and translated, with corresponding changes of the dielectric constant of the material flowing toward the charge box, all to achieve the necessary smooth lay-up and substantially continuous dielectric variation which is desired.

After the charge box 23, and particularly the recess 24, has been filled with material in accordance with the technique described (and it will be appreciated, of course, that charge box 23 may itself comprise a mold if practicable) the lay-up may then be fused into a complete and monolithic unit, e.g., by a steam molding process. An apparatus such as that shown in FIGURE 2B may be employed to this effect, whereby the entire hemispherical surface of charge 27 in the final lay-up may be subjected to steam flow through pipe 28, the opposite side of the apparatus being coupled to a vacuum exhaust 29 centrally located at the exhaust port in the masked equitorial planar surface. In such a steam molding step, the arrangement shown in FIGURE 2B is particularly desirable since it achieves steam flow in directions normal to the lens spherical surface; and such flow is highly preferred in order that any density shifts which might occur during fusion may be spherically symmetric and hence may be accommodated from a dielectric standpoint by appropriate gate contour modifications during lay-up of the lens media.

After completion of the fusion process, the fused lens 30 may be unmolded as shown in FIGURE 2C; and said lens 30 may then be heat-treated, as at 31, for an extended period of time to effect removal of all moisture therefrom, as well as to insure dimensional stability. In a typical case (e.g., using a polystyrene matrix) moisture removal and stress relief can be effected in a stabilization room wherein fused lens 30 is subjected to a constant temperature of approximately 170° F. for a period of three to seven days.

The resulting mass 30 which, it will be appreciated, is of generally hemispherical configuration, comprising a body bounded by an outer spherical surface 32 and a substantially planar boundary surface 33. By reason of the programmed cross-feeding achieved, the mass 30 further exhibits a smoothly varying three-dimensional constant gradation along its radii, i.e., in any of the directions 34 extending between the center 35 of the lens and normal to the outer hemispherical surface thereof. The outermost surface of the body 30 is, moreover, as a result of the contours of gates 14 and 15, substantially comprised of plain polystyrene beads only, whereby this outer surface has a dielectric constant which closely approximates that of surrounding air.

In the final lens, dielectric discontinuities at the outer surface of the lens are thus substantially eliminated, thereby minimizing losses as energy passes into or out of the lens. The body 30 is, moreover, monolithic and has no internal interfaces or dielectric discontinuities which could cause wave scatter or dispersive losses. Finally, it will be appreciated that the body 30 is formed readily and relatively inexpensively by a unique and reproducible process, whereby once the initial fabrication techniques have been finalized, highly uniform lenses can be made in mass production.

The lenses thus produced may be substantially hemispherical as illustrated by the mass 30. While hemispheres, sections of hemispheres, or spherical segments may serve as basic modules for spherical lens construction, such lens modules can be used directly, of course, as transmitting or receiving elements. For example, a hemispherical lens can be associated with a reflecting plane, or mirror, i.e., a conductive plate, disposed generally parallel to boundary plane 33 so as to cause the lens to effectively operate as a true sphere. The lens may, moreover, take the form of a spherical segment less than a hemisphere, e.g., by severing the lens along a further boundary plane such as 36 subsequent to fusion and stabilization thereof; and the spherical segments thus produced either above or below parting plane 36 can be employed depending upon the particular operation contemplated. Moreover, a spherical segment less than a hemisphere, similar for example to the section below parting plane 36, can be directly achieved by merely causing the feeding and programming process to terminate after a lay-up to plane 36 has been achieved; and in this respect, the rotatable three-dimensional gates 14 and 15 can be associated with appropriate switching or control members operative to terminate the feeding process after a particular desired lay-up has been achieved.

Certain aspects of the foregoing discussion will be more fully appreciated by reference to FIGURE 4; and this particular figure has, for purposes of correlation with the figures previously described, utilized many of the same numerals discussed above. The cross-fed materials are, as illustrated, caused to pass along flow paths 12 and 13 (corresponding to the conveyors already described) toward a mixing line 16, whereafter said materials are discharged into recess 24. The materials are, moreover, programmed by the aforementioned three-dimensionally contoured gates 14 and 15; and the gating contours or gate openings are caused to change with elapse of time in the manner indicated at 14a through 14d (for gate 14) and at 15a through 15d (for gate 15), with the actual gate openings being depicted by the crosshatched sections in each of the gating representations 14a through 14d and 15a through 15d for successive arbitrarily selected instantaneous times $t_1$ through $t_4$ inclusive.

At time $t_0$, gate 14 is entirely closed, but gate 15 (associated with the $\epsilon_{min.}$ feeder 13) preferably defines a very small opening whereby an initial deposit of material, comprising $\epsilon_{min.}$ material only, is deposited at a lowermost location below the axial center of recess 24 (designated $r_0$ in FIGURE 4). At time $t_1$, gates 14 and 15 each open a small amount to provide openings of the type shown at 14a and 15a, with each of these openings having curvatures corresponding to the $h_1$ and $h_2$ Equations 3 and 4, supra, as related to an instantaneous charge radius $r_1$. With further elapse of time, i.e., at a time $t_2$, the two gate openings increase somewhat, as illustrated at 14b and 15b. Again, these gate openings respectively have the $h_1$ and $h_2$ curvatures discussed previously, but as related to a somewhat larger instantaneous charge radius $r_2$. Similar operation occurs at times $t_3$ and $t_4$, as illustrated respectively by the increasingly larger gate openings 14c and 15c and 14d and 15d, as related to the successively larger instantaneous charge radii $r_3$ and $r_4$. For each of these successive openings, moreover, the vertical lens dimensional variable $y$ has been depicted at $y_1$, $y_2$, $y_3$ and $y_4$, respectively.

By reason of the discussion given previously, and utilizing the cross-hatched gate openings shown at 14a through 14d and 15a through 15d, a substantially smooth lay-up of material is achieved in hemispherical recess 24 along instantaneous successively increasing charge radii. The final lay-up thus exhibits a desired three-dimensional smooth variation in dielectric index, and achieves this gradation directly in a hemispherically shaped mass.

If desired, the several gate openings associated with the $\epsilon_{min.}$ feeder gate 15 can be expanded, in accordance with the dotted representations at 15'$_a$, 15'$_b$, and 15'$_c$. With this alternative gate opening configuration, the additional portions of the gate opening (at 15'$_a$ through 15'$_c$) merely operate to permit the flow of $\epsilon_{min}$ material toward the charge box. By utilizing a substantially cylindrical charge box, therefore, a lay-up can be achieved wherein the hemispheroidal three-dimensionally variable mass bounded by line 24 is effectively embedded within a supporting matrix 24a of near-unity or substantially constant index material; and this extra material 24a can later (e.g., after the steam molding or stabilization steps) be removed from the outer surface of the hemispherical portion, if desired, by a turning or like operation. Moreover, by utilizing a cylindrical charge receptacle along with the modified gating array depicted at 15'$_a$ et seq., a fully spherical lens can be directly achieved within the cylindrical charge box simply by continuing the program beyond the time $t_4$ to achieve a lay-up during successive times corresponding respectively to that shown in FIGURE 4 for times $t_3$, $t_2$, $t_1$ and $t_0$ in sequence.

The three-dimensional contoured gates 14 and 15 may take various configurations; and two typical such configurations have been shown in FIGURES 5 and 6. FIGURES 5A through 5C illustrate three-dimensional contoured gates having substantially continuous warped gating surfaces arranged to successively control an effective gate opening by related control of the rotational positions of said gates. Moreover, the several gates actually illustrated in FIGURES 5A through 5B, particularly the gates 15, correspond to the alternative gate configurations 15'$_a$, 15'$_b$, etc., discussed in reference to FIGURE 4. FIGURE 5A shows the relative disposition of gates 14 and 15 at an initial time $t_0$; and during this time the warped surface of gate 14 has a section disposed closely adjacent to its associated feeder or conveyor across the entire width thereof, so as to effectively prevent the passage of $\epsilon_{max}$ material to the mixing line 16. At this same initial time $t_0$, the gate 15 has its warped surface so arranged as to exhibit an opening 15' adapted to deposit $\epsilon_{min}$ material across the entire base of a cylindrical receptacle. The gates 14 and 15 are driven synchronously through an appropriate drive mechanism 18–18a about their axes of rotation with elapse of time, so that at successive times $t_b$ and $t_c$ (depicted respectively in FIGURES 5B and 5C) successively different openings are provided between the warped surfaces of gates 14 and 15, and their associated overlying conveyors. The change of gating opening during elapse of successive instants of time is, with the arrangement of FIGURES 5A through 5C achieved smoothly and continuously generally in accordance with the discussion previously given in respect to FIGURE 4.

Rather than employing continuous warped surfaces of the types which characterize the gates shown in FIGURES 5A through 5C, plural plate gates of the types illustrated in FIGURES 6A through 6C may be employed; and insofar as the instantaneous gate openings are concerned, the representations shown in FIGURES 6A through 6C are intended to correspond respectively to those shown in FIGURES 5A through 5C for the successive times $t_0$, $t_b$ and $t_c$. In the alternative arrangements of FIGURES 6A and 6C, each of the gating structures 14 and 15 comprise a plurality of elongated plates fastened in a fanned configuration to a common axis of rotation; with each of said elongated plates having a contoured control edge spaced from said axis of rotation and shaped in accordance with Equations 3 and 4, supra, for successively arbitrarily selected instants of time. The actual arrangement shown in FIGURES 6A through 6C utilizes seven gating plates for each of the effectively three-dimensionally contoured gates 14 and 15, whereby the programming is actually achieved smoothly and continuously (although the gate is constructed in successive steps). Larger or smaller numbers of plates can be utilized depending upon the approximations which it is desired to tolerate and the accuracy which it is desired to achieve. The seven plates comprising gating means 14 have been illustrated in FIGURE 6A as plates 40 through 46 inclusive, whereas the seven plates comprising gate 15 have been depicted in this same FIGURE 6A as plates 50 through 56 inclusive. The repositioning of these various plates with elapse of time will be readily appreciated by consideration of the related numerals in FIGURES 6B and 6C.

Once a spherical segmental lens, or a substantially spherical lens of the types discussed above, has been completed, it is immediately possible and indeed desirable to test the resulting lens at its ultimate frequency of operation. By such a testing technique, the lens quality and focal point can be readily established without need of the costly and time-consuming assembly steps which have characterized lens fabrication techniques suggested heretofore. Moreover, if the lens characteristics are found to depart from those desired, the artificial dielectric media, and/or the loading concentration therein, can be appropriately changed before continuing with the fabrication of further lens units. This, in itself, represents a significant additional saving in money and labor over techniques suggested heretofore, since it assures proper and consistent performance of mass produced lenses. By such a testing technique, the actual dielectric gradation across the lens can be determined; and if it is found that this gradation departs from that actually desired, simple adjustments of the contours of gates 14 and 15, or of the individual plates thereof, can be effected to take care of such deviations at the particular point of lay-up where the discrepancy has occured. With such preliminary adjustment of the gate contour and/or dielectric media, the accuracy of subsequent lenses can thus be immediately assured; and this accuracy will persist as multiple such lenses are fabricated; a result impossible heretofore.

The technique described may be utilized to form lenses of any desired size, with the largest lens which can be fabricated being limited only by such physical limitations as the size of molds or charge boxes 23 which are available to receive the initial charge. The present invention is particularly useful in the construction of relatively small diameter lenses (e.g., ten feet in diameter) but there is no theoretical restriction on the lens size or on the electrical or dimensional configuration which may be produced.

As mentioned previously, the three-dimensionally graded mass achieved by the present invention can be used directly as a lens. In the alternative, however, it may be employed as a starting material in the fabrication of other lens formations, e.g., one or more three-dimensionally graded masses such as 30 can be severed into variously shaped subcomponents which may thereafter be reassembled in different configurations when more complex lens formations are desired or required by a particular installation. Still other variations and modifications will be suggested to those skilled in the art. It must, therefore, be understood that while I have thus described a preferred technique and embodiment of the present invention, all such variations and modifications as are in accord with the principles described are meant to fall within the scope of the appended claims.

Having thus described my invention, I claim:

1. The method of fabricating a monolithic mass of dielectric material having a variation in dielectric constant therein which comprises the steps of cross-feeding a particulate dielectric material of near-unity dielectric constant with a particulate dielectric material of higher dielectric constant, said cross-feeding being effected along a radius of a circularly symmetrical collection receptacle, progressively altering the amounts of said materials being mixed with one another at different points along said radius as said cross-feeding step proceeds, rotating said collection receptacle during said cross-feeding step and simultaneous with said progressive altering step to build up a circularly symmetrical mass of said cross-fed particulate material having a three-dimensional variation in dielectric constant, and fusing the material in said collection receptacle into a monolithic mass of three-dimensionally graded dielectric material.

2. The method of claim 1 wherein said progressive altering step is effected smoothly and substantially continuously during said cross-feeding step.

3. The method of claim 1 wherein said progressive altering step is effected as a plurality of successive discrete alterations in the amounts of said materials being mixed with one another as said cross-feeding step proceeds.

4. The method of claim 1 wherein said altering step is so effected as to cause said cross-fed materials to be initially confined to a region underlying the axial center of said circularly symmetrical receptacle, with the region of cross-feeding being successively increased along said radius outwardly of said receptacle center as said cross-feeding step proceeds.

5. The method of claim 1 wherein said cross-fed materials are fed at different rates respectively, the combined flows of said cross-fed materials being effected in a composite, substantially triangular distribution pattern along said radius.

6. The method of claim 1 including the step of removing portions of said monolithic mass subsequent to said fusing step thereby to produce a remaining mass having a desired external surface configuration.

7. The method of fabricating a mass of dielectric material which comprises feeding a first dielectric material having a first dielectric constant toward a discharge line via a first three-dimensionally contoured gate structure, feeding a second dielectric material of second, different dielectric constant toward said discharge line via a second three-dimensionally contoured gate structure, mixing said first and second dielectric materials at said discharge line thereby to produce a mass of varying dielectric constant material having a variation in dielectric constant along said line, and successively repositioning said first and second three-dimensionally contoured gate structures thereby successively to alter said dielectric constant variation along said line as said feeding steps proceed.

8. The method of claim 7 wherein said discharge line is located along a radius of a circularly symmetrical collection receptacle, said method including the step of rotating said receptacle during collection of said mixed materials therein to build up a circularly symmetrical mass of said varying constant dielectric material.

9. The method of claim 7 wherein said mixing step initially mixes said materials at a confined portion of said discharge line, said mixing step lengthening the portions of said discharge line along which said mixing occurs with elapse of time.

10. The method of fabricating a three-dimensional dielectric lens of varying index which comprises feeding a first relatively high index dielectric material toward a predetermined discharge line having a length R, the amount $h_1$ of said first material being varied along said line substantially in accordance with the equation:

$$h_1 = \frac{Kx}{R^3}[R^2 - x^2 - (y-R)^2]$$

where $x$ and $y$ are lens dimensional variables and K is a constant, feeding a second lower index dielectric material toward said discharge line, the amount $h_2$ of said second material being varied along said line substantially in accordance with the equation:

$$h_2 = \frac{Kx}{R}(\epsilon_{max.} - 1) - h_1$$

where $\epsilon_{max.}$ is the dielectric constant of said first material, and mixing said first and second variably fed materials with one another along said discharge line.

11. The method of claim 10 wherein said first material comprises a conductive sliver loaded artificial dielectric material.

12. The method of claim 10 including the step of collecting said mixed materials in a substantially hemispherical collection receptacle, and repositioning said receptacle during said feeding and mixing steps to lay up a circularly symmetrical mass of said mixed materials within said receptacle.

13. The method of claim 12 wherein said discharge line comprises a radius of said receptacle, said repositioning step comprising rotating said receptacle.

14. The method of fabricating a three-dimensional mass of dielectric material having a smooth substantially three-dimensional variation in dielectric constant which comprises the steps of cross-feeding a first particulate dielectric material of first dielectric constant with a second particulate dielectric material of higher dielectric constant, said cross-feeding being effected along a radius of a circularly symmetrical charge box, controlling and successively altering the ratio of flow of said cross-fed materials at different points along said radius, rotating said charge box during said cross-feeding to build up a circularly symmetrical mass of said cross-fed particulate material, and thereafter fusing said cross-fed particulate material into a monolithic mass.

15. The method of claim 14 wherein said cross-feeding and flow rate control steps are so effected as to build up a mass of substantially fixed dielectric constant material having a further mass of three-dimensionally varying dielectric constant material at least partially embedded therein, said method including the further step of removing at least portions of said fixed dielectric constant material from said monolithic mass subsequent to said fusing step.

16. The method of claim 14 wherein said fusing step comprises subjecting the cross-fed material in said charge box to steam directed normally to the outermost faces of said circularly symmetrical mass.

17. The method of claim 14 wherein said method includes the further step of subjecting said monolithic mass to heat for an extended period of time to stabilize the dimensions of said mass subsequent to said fusing step.

18. The method of fabricating a monolithic mass having a three-dimensional variation in dielectric constant, comprising the steps of cross-feeding two dielectric materials having different dielectric constants toward a mixing location through two differently contoured gates, said cross-feeding step occurring over an interval of time, successively repositioning said gates in accordance with a predetermined program during said interval of time to vary the amounts of said two dielectric materials which are mixed with one another at said mixing location during said interval of time thereby to produce a body of mixed dielectric materials having a dielectric constant variation in three dimensions, collecting said body of mixed materials, and thereafter fusing said collected materials into a monolithic mass.

19. An apparatus for producing a mass of dielectric material exhibiting a variation in dielectric constant, comprising first means for feeding a first dielectric material toward a mixing location, second means for feeding a second dielectric material, having a dielectric constant different from that of said first material, toward said mixing location, first and second three-dimensionally contoured gates located respectively adjacent said first and second feeding means upstream of said mixing location, and means for successively repositioning said first and second gates at rates related to the feed rates of said first and second feeding means for altering the amounts of said materials which are mixed with one another at said mixing location with elapse of time.

20. The apparatus of claim 19 wherein said first and second feeding means comprise a pair of conveyors, said three-dimensionally contoured gates comprising elongated gate structures located above and extending across said conveyors, said gate structures being mounted for rotation about axes located in directions generally parallel to one another and extending in the directions of elongation of said gate structures, said repositioning means comprising drive means for synchronously rotating said gates about their said axes.

21. The apparatus of claim 20 including a circularly symmetrical collection receptacle, said mixing location comprising a line disposed in a plane passing through the circular axis of said receptacle, said conveyors having discharge ends disposed closely adjacent one another and adjacent said line, and means for rotating said receptacle during operation of said feeding means.

22. The apparatus of claim 19 wherein said three-dimensionally contoured gates comprise a plurality of elongated plates having elongated edges disposed along a comman axis of rotation and having further differently contoured elongated edges spaced from said axis of rotation, said repositioning means being operative to move successive ones of said differently contoured elongated plate edges about said axis of rotation into position adjacent said feeding means.

23. The apparatus of claim 19 wherein said three-dimensionally contoured gates comprise elongated bodies having substantially continuously warped surfaces, said bodies being mounted for rotation along axes extending in the directions of their elongation.

24. A feeding apparatus comprising a pair of elongated conveyors having discharge ends disposed closely adjacent one another, means for supplying dielectric materials having different dielectric constants respectively to said pair of conveyors, means for driving said conveyors to effect flow of said different dielectric materials toward one another for mixing with one another at said adjacent discharge ends, means for controlling said mixing comprising a pair of three-dimensionally contoured gates mounted for movement adjacent said pair of conveyors respectively upstream of said discharge ends and means for successively repositioning both of said movable contoured gates in accordance with a predetermined program thereby to effect a substantially continuous variation in the amounts of said materials which are mixed with one another during a given interval of time.

25. The apparatus of claim 24 wherein said conveyors are substantially planar, said conveyors being disposed in substantially aligned opposing relation to one another with their respective planes being disposed substantially horizontally, said three-dimensionally contoured gates extending across and above said pair of conveyors and being mounted for rotation on generally horizontal axes.

26. Means for preparing a dielectric article having a controlled variation in dielectric constant, comprising a collection receptacle, means for cross-feeding two different index dielectric materials toward a common mixing and discharge line extending at least partially across said collection receptacle, and program means operative at a rate related to the rate of operation of said cross-feeding means for successively altering the relative feed rates of said two different materials at different points along said line with elapse of time.

27. The structure of claim 26 wherein said last-named means comprises movable gating means positioned upstream of said discharge line.

28. The structure of claim 27 wherein said gating means has a three-dimensionally contoured gating surface.

References Cited

UNITED STATES PATENTS

| 2,183,520 | 12/1939 | Vanderhoef. | |
| 2,341,732 | 2/1944 | Marvin | 264—122 X |
| 2,689,398 | 9/1954 | Gaut | 264—111 X |
| 2,761,141 | 8/1956 | Strandberg et al. | 343—911 |
| 2,806,254 | 9/1957 | Craig | 264—122 |
| 3,001,267 | 9/1961 | Heibel et al. | 29—155.5 |
| 3,015,102 | 12/1961 | Crane et al. | 343—911 |
| 3,055,055 | 9/1962 | Seigel. | |
| 3,082,510 | 3/1963 | Kelly et al. | 29—155.5 |

OTHER REFERENCES

Wood: "Physical Optics," pp. 86–88, copyright 1911, MacMillan Co.

JOHN F. CAMPBELL, *Primary Examiner.*

HERMAN K. SAALBACH, WILLIAM I. BROOKS,
*Examiners.*

W. K. TAYLOR, *Assistant Examiner.*